(12) United States Patent
Akamine et al.

(10) Patent No.: US 10,446,034 B2
(45) Date of Patent: Oct. 15, 2019

(54) DRIVING SUPPORT SYSTEM

(71) Applicant: DENSO CORPORATION, Kariya, Aichi-pref. (JP)

(72) Inventors: Yusuke Akamine, Nishio (JP); Tomohiko Tsuruta, Nishio (JP); Yasuyuki Miyake, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 79 days.

(21) Appl. No.: 15/744,953

(22) PCT Filed: Jul. 8, 2016

(86) PCT No.: PCT/JP2016/070333
§ 371 (c)(1),
(2) Date: Jan. 15, 2018

(87) PCT Pub. No.: WO2017/014080
PCT Pub. Date: Jan. 26, 2017

(65) Prior Publication Data
US 2018/0211536 A1 Jul. 26, 2018

(30) Foreign Application Priority Data
Jul. 17, 2015 (JP) .................... 2015-142925

(51) Int. Cl.
*G06F 17/00* (2019.01)
*G08G 1/16* (2006.01)
(Continued)

(52) U.S. Cl.
CPC .............. *G08G 1/166* (2013.01); *B60W 30/09* (2013.01); *G01S 13/723* (2013.01);
(Continued)

(58) Field of Classification Search
CPC ........ G08G 1/166; G01S 13/723; G01S 13/86; G01S 2013/9353; G01S 13/867;
(Continued)

(56) References Cited

U.S. PATENT DOCUMENTS 8,244,408 B2 * 8/2012 Lee ................... B60W 30/0953
180/169
2008/0065328 A1 * 3/2008 Eidehall ................. G01S 7/295
701/301
(Continued)

FOREIGN PATENT DOCUMENTS

JP 2009-074803 4/2009

*Primary Examiner* — Shardul D Patel
(74) *Attorney, Agent, or Firm* — Knobbe, Martens, Olson & Bear, LLP

(57) ABSTRACT

The driving support system detects an object existing around an own vehicle. The driving support system 1 predicts a position of a movement destination of the detected object. The driving support system sets a region having a predetermined width at each of an X coordinate and a Y coordinate as a tracking region to be set for tracking the object, based on an XY coordinate of the position of the predicted movement destination of the object. The driving support system limits the tracking region, based on a tracking exclusion region where objects unsuitable as tracking targets may be detected with high probability. At that time, the driving support system limits the tracking region by excluding the tracking exclusion region from the tracking region.

4 Claims, 4 Drawing Sheets

(51) Int. Cl.
*B60W 30/09* (2012.01)
*G01S 13/72* (2006.01)
*G01S 13/86* (2006.01)
*G01S 13/93* (2006.01)

(52) U.S. Cl.
CPC .......... *B60W 2550/10* (2013.01); *G01S 13/72* (2013.01); *G01S 13/86* (2013.01); *G01S 13/867* (2013.01); *G01S 13/931* (2013.01); *G01S 2013/9353* (2013.01); *G01S 2013/9375* (2013.01); *G01S 2013/9378* (2013.01)

(58) Field of Classification Search
CPC ............. G01S 13/72; G01S 2013/9378; G01S 13/931; G01S 2013/9375; B60W 30/09; B60W 2550/10
USPC ......... 701/301; 382/103; 340/436, 905, 910, 340/915, 932; 348/148, 118, 46
See application file for complete search history.

(56) References Cited

U.S. PATENT DOCUMENTS

| | | | |
|---|---|---|---|
| 2011/0133917 A1* | 6/2011 | Zeng | G06K 9/6293 340/436 |
| 2011/0313665 A1* | 12/2011 | Lueke | G01S 13/931 701/301 |
| 2013/0181860 A1* | 7/2013 | Le | G01S 13/931 342/72 |
| 2013/0223686 A1* | 8/2013 | Shimizu | G08G 1/166 382/103 |
| 2014/0071278 A1* | 3/2014 | Assaf | B60R 1/12 348/148 |
| 2014/0361882 A1* | 12/2014 | Akiyama | G08G 1/16 340/435 |
| 2015/0353081 A1* | 12/2015 | Kaminade | G01S 13/931 701/1 |
| 2016/0176399 A1* | 6/2016 | Takagi | G08G 1/166 701/301 |
| 2016/0288799 A1* | 10/2016 | Nguyen Van | B60W 50/029 |
| 2017/0205494 A1* | 7/2017 | Shimizu | G01S 13/34 |
| 2019/0126775 A1* | 5/2019 | Han | G05B 19/418 |

* cited by examiner

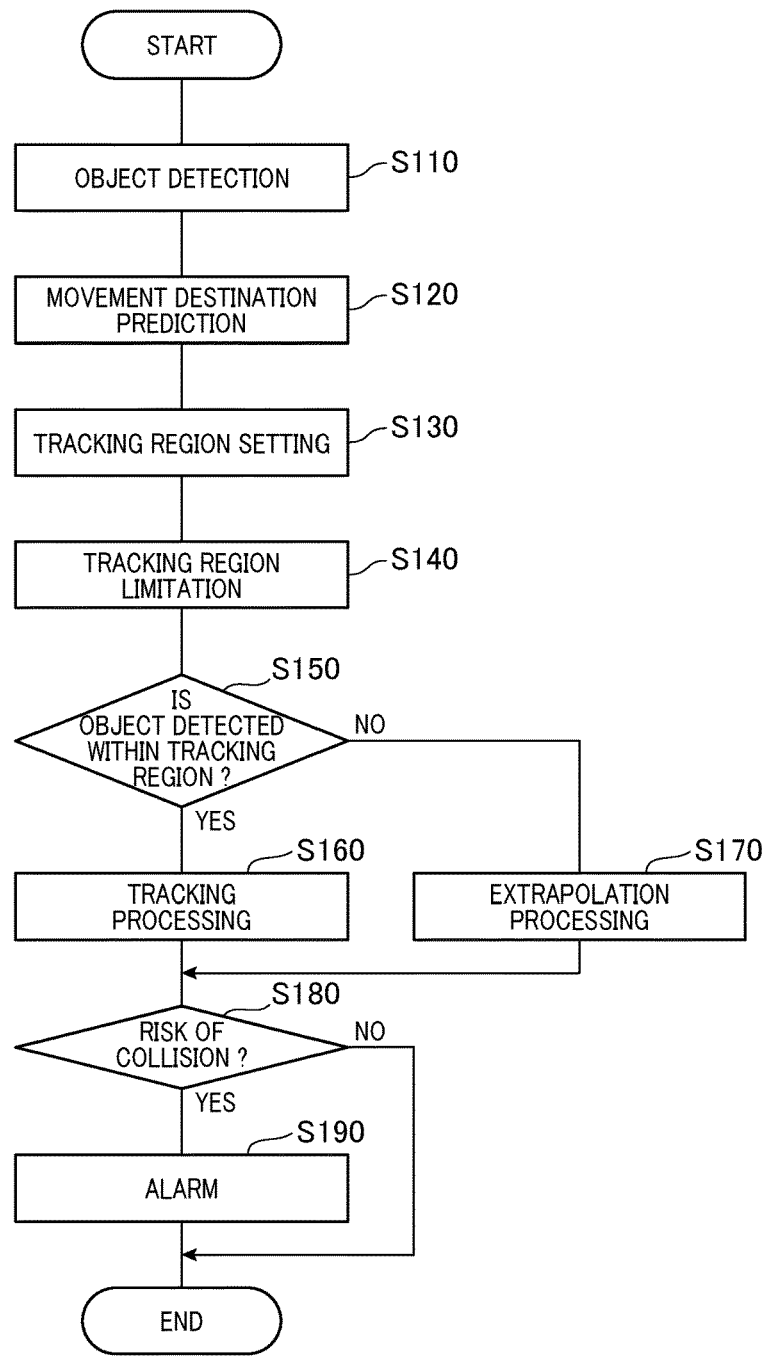

DRIVING SUPPORT SYSTEM

CROSS-REFERENCE TO RELATED APPLICATION

This application is based on and claims the benefit of priority from earlier Japanese Patent Application No. 2015-142925 filed on Jul. 17, 2015, the description of which is incorporated herein by reference.

TECHNICAL FIELD

The present disclosure relates to a technology performing driving support for avoiding collision between an object existing around an own vehicle and the own vehicle or alleviating collision damage therebetween.

BACKGROUND ART

In conventional driving support technology, the following technology performing driving support is known. According to the conventional technology, objects existing around an own vehicle is detected, using a sensor such as a camera, a radar, and so on. In addition, in the conventional technology, a risk of collision between the detected object and the own vehicle is determined. The conventional technology performs driving support for avoiding collision between the object and the own vehicle or alleviating collision damage therebetween, based on the determination result.

In this manner, the conventional driving support performs processing for detecting the object existing around the own vehicle (that is, object detection). For example, Patent Literature 1 discloses that an object detection apparatus includes a radar apparatus performing the object detection, and sets a tracking region of the object detected by the radar apparatus depending on a direction in which the object is detected.

CITATION LIST

Patent Literature

[PTL 1] JP 2009-74803 A

SUMMARY OF THE INVENTION

Technical Problem

However, there is the following problem in the technology disclosed in the above Patent Literature 1. This problem is described with reference to FIG. 4A and FIG. 4B of the present application. For example, as illustrated in FIG. 4A, when tracking an object (for example, a pedestrian or the like) moving at low speed, a moving distance of the object is small for a predetermined period (one cycle) during which the object is detected. Therefore, a tracking region A1 may include a predicted position P1 of the object after the predetermined period elapses (that is, a predicted position of a movement destination) and a current position P0 of the object (that is, a position of a movement origin). In this case, as illustrated in FIG. 4B, when an object R1 other than the object is detected, the detected object R1 is also determined as a tracking target. Here, for convenience, this case is described in a setting in which the object detected in a former timing is set as a first object and the object detected in a latter timing (that is, the object other than the first object) is set as a second object. At that time, it is assumed that a second object R1 is approaching an own vehicle Q1. The second object R1 moving speed is lower than the first object moving speed. If the second object R1 is positioned further in the direction of the object than the current position P0 of the first object is, as seen from the own vehicle Q1, in the technology, the second object R1 may be incorrectly recognized as moving in a direction away from the own vehicle Q1. Thereby, in the above-mentioned case, the technology may incorrectly presume a moving direction of the second object R1 and lose sight of the tracking target (that is, a target loss may occur).

The purpose of the present disclosure is to provide a technology (driving support system) for precisely tracking an object in object detection performed during driving support for avoiding collision between the object existing around an own vehicle and the own vehicle or alleviating collision damage therebetween.

Solution to Problem

The technology of the present disclosure is based on the following viewpoint. An object moving away from the own vehicle is not suitable as a tracking target of the object detection performed during driving support, because there is a low risk of the object colliding with the own vehicle. In addition, even if the object is approaching the own vehicle, the object incorrectly recognized as moving in a direction away from the own vehicle is not suitable as a tracking target, because the present technology may lose sight of the tracking target (that is, a cause of target loss). Thereby, it is not suitable that the tracking region includes a region where these objects that are not suitable as tracking targets may be detected with high probability. This region is considered as a region that is located on a rear side of a position of the movement destination of the object (that is, the predicted position), relative to a moving direction of the object. For example, when the object is seen from the own vehicle, the region that is located behind the object, relative to a moving direction of the object, the object being an object which is moving towards the own vehicle.

The driving support system of the present disclosure determines, as an exclusion region, a region that is located behind the position of the movement destination of the object, as seen from the own vehicle. That is, the driving support system of the present disclosure determines, as the exclusion region, the region that is located in the direction of the object and further from the own vehicle than the object is. The driving support system of the present disclosure excludes the exclusion region from the tracking region when setting the tracking region to be set for tracking objects existing around the own vehicle. Note that the tracking range, after exclusion, includes the predicted movement destination of the object. That is, the tracking region excluded the exclusion region includes the position of the predicted movement destination of the object.

Thereby, there is a low risk of the driving support system of the present disclosure detecting objects which are not suitable as tracking targets, because the driving support system excludes, from the tracking region, the region where there is a high possibility of objects which are not suitable as tracking targets being detected.

Therefore, the driving support system of the present disclosure can precisely track the object during object detection performed in the driving support for avoiding collision between the object existing around the own vehicle and the own vehicle or alleviating collision damage therebetween.

BRIEF DESCRIPTION OF THE DRAWINGS

FIG. 3 is a flowchart illustrating a driving support process.

DESCRIPTION OF THE EMBODIMENTS

Embodiments of the driving support system of the present disclosure will be described with reference to drawings, as follows.

[1. Description of the Configuration of the Driving Support System 1]

The driving support system 1 according to the present embodiment is mounted in the own vehicle. In addition, if there is a risk of collision between the object and the own vehicle, the driving support system 1 performs driving support by an actuation of, for example, an alarm, braking, or the like, for avoiding collision between the own vehicle and the object or alleviating collision damage therebetween.

Figure 1A:
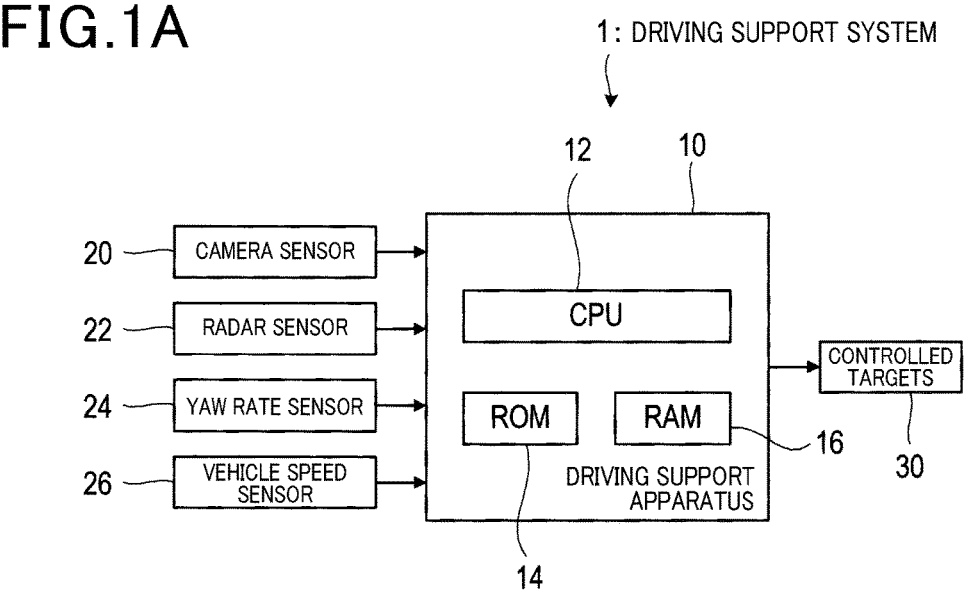
FIG. 1A is a view illustrating a configuration of a driving support system.

As illustrated in FIG. 1A, the driving support system 1 is provided with a driving support apparatus 10, controlled targets 30, and various types of sensors. The driving support system 1 includes, for example, a camera sensor 20, a radar sensor 22, a yaw rate sensor 24, a wheel speed sensor 26, and so on, as the various types of sensors. The various types of sensors and the controlled targets 30 are electrically connected with the driving support apparatus 10. Thereby, the driving support apparatus 10 obtains detection results of the various types of sensors, and transmits control signals to the controlled targets 30 based on the obtained detection results.

The camera sensor 20 is configured as, for example, a stereo camera that can detect a distance to an object. The camera sensor 20 detects object information including the type and the shape of the imaged object, a distance between the object and the own vehicle (that is, a relative distance), an object's angle with respect to the own vehicle, and so on, based on a captured image. The camera sensor 20 may classify the type of the detected object into a vehicle, a pedestrian, and others.

Figure 1B:
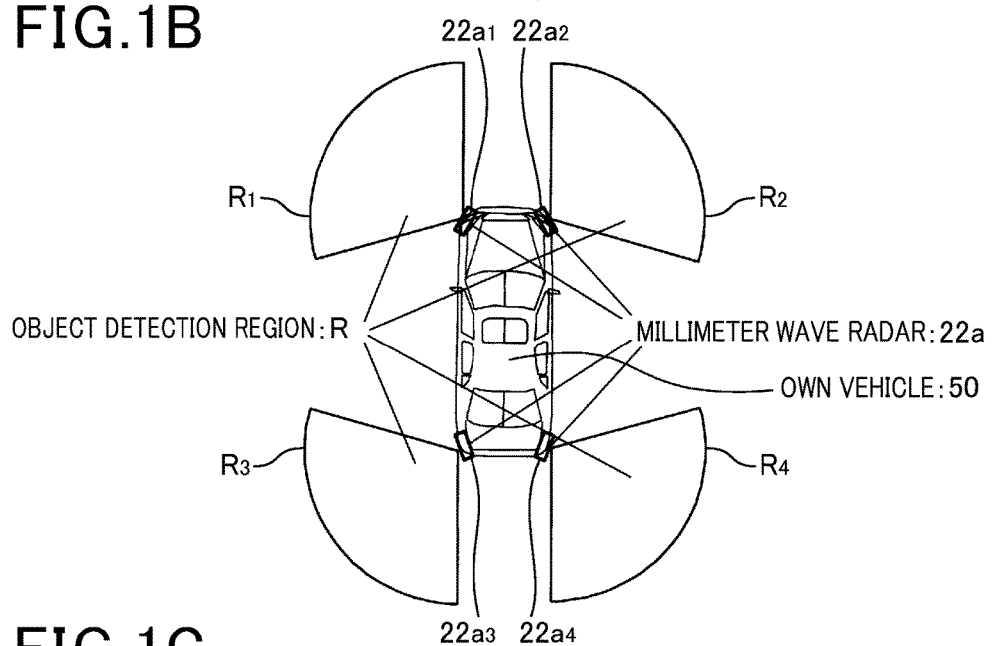
FIG. 1B is a view illustrating a driving support system.

The radar sensor 22 transmits electromagnetic waves such as millimeter waves having directivity to the object, and receives reflected waves from the object. The radar sensor 22 detects the object information including the distance between the object reflecting the electromagnetic waves and the own vehicle (that is, the relative distance) and the moving speed of the object relative to the own vehicle (that is, a relative speed), etc., based on a period from a time when the electromagnetic waves are transmitted until a time when receipt of the reflected waves is completed. FIG. 1B illustrates millimeter wave radars 22a, as one example of the radar sensor 22. As illustrated in FIG. 1B, in this embodiment, four millimeter wave radars 22a are installed at four corners (left-front, right-front, left-rear, and right-rear) of an own vehicle 50, as the radar sensors 22. A millimeter wave radar $22a_1$ installed at a left-front portion of the own vehicle 50 transmits the millimeter waves while scanning an area $R_1$ of a predetermined angle in right and left directions, with respect to the left-front portion of the vehicle. A millimeter wave radar $22a_2$ installed at a right-front portion of the own vehicle 50 transmits the millimeter waves while scanning an area $R_2$ of the predetermined angle in right and left directions, with respect to the right-front portion of the vehicle. A millimeter wave radar $22a_3$ installed at a left-rear portion of the own vehicle 50 transmits the millimeter waves while scanning an area $R_3$ of the predetermined angle in right and left directions, with respect to the left-rear portion of the vehicle. A millimeter wave radar $22a_4$ installed at a right-rear portion of the own vehicle 50 transmits the millimeter waves while scanning an area $R_4$ of the predetermined angle in right and left directions, with respect to the right-rear portion of the vehicle. In the present embodiment, each of the areas $R_1$, $R_2$, $R_3$, and $R_4$ of these four predetermined angles is set as an object detection region R of millimeter wave radars 22a.

The yaw rate sensor 24 detects an angular velocity during turning (that is, yaw rate) of the own vehicle 50. In addition, the wheel speed sensor 26 detects a vehicle speed of the own vehicle 50, based on a revolution speed of a wheel. In this manner, the yaw rate sensor 24 and the wheel speed sensor 26 detect travelling information including the yaw rate and the vehicle speed of the own vehicle 50.

The driving support apparatus 10 is configured of a microcomputer provided with a CPU 12, memory (for example, ROM 14 or RAM 16), and so on. The CPU 12 executes a program stored in the ROM 14, and thereby the driving support apparatus 10 performs various types of processing relating to the driving support. Note that the driving support apparatus 10 may be configured of, for example, an ECU.

The driving support apparatus 10 actuates the controlled targets 30, based on the detection results (that is, the object information and the travelling information of the own vehicle 50) obtained from the various types of sensors, in order to perform the driving support. At that time, the driving support apparatus 10 generates control signals based on the detection results and sends the generated control signals, and thereby actuates the controlled targets 30. One example of the controlled targets 30 includes an alarm apparatus that sounds an alarm, or actuators that drive, for example, a braking apparatus, a steering apparatus, and a safety device such as a seat belt.

Figure 1C:
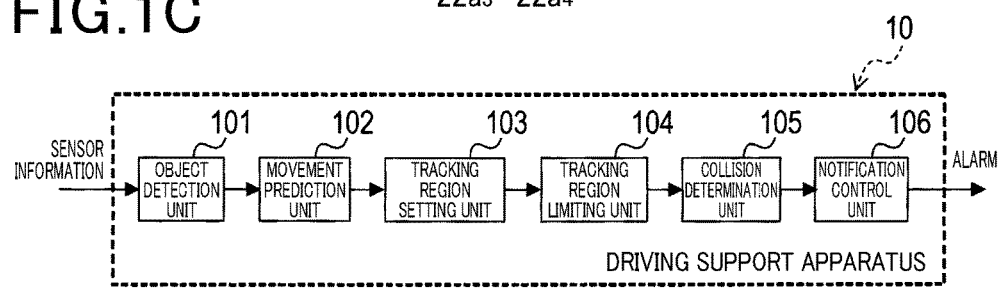
FIG. 1C is a functional block diagram of a driving support system.

The CPU 12 executes processing, and thereby the driving support apparatus 10 accomplishes the following functions. As illustrated in FIG. 1C, the driving support apparatus 10 has an object detection unit 101, a movement prediction unit 102, a tracking region setting unit 103, a tracking region limiting unit 104, a collision determination unit 105, and a notification control unit 106, as functions relating to the driving support.

Figure 2A:
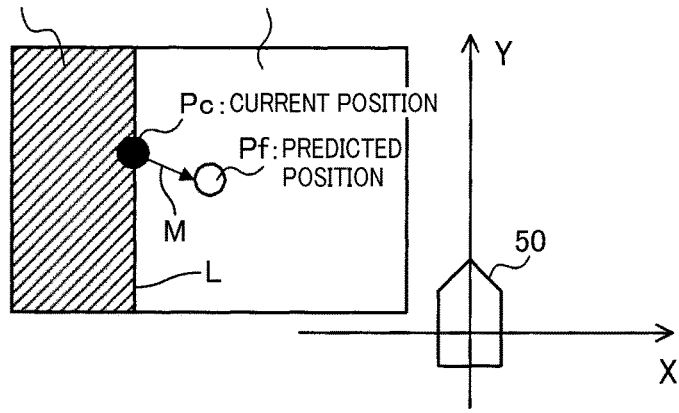
FIG. 2A is a view illustrating a driving support process.
Figure 2B:
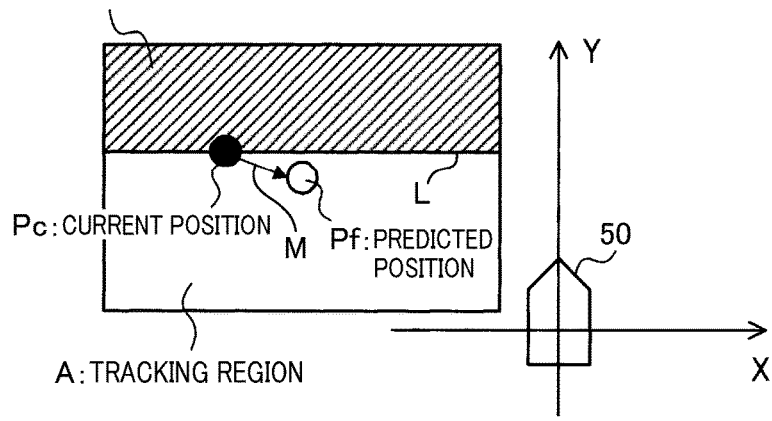
FIG. 2B is a view illustrating a driving support process.
Figure 2C:
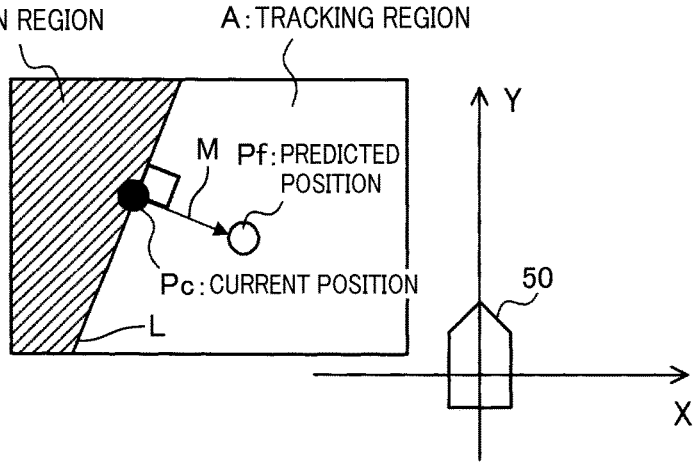
FIG. 2C is a view illustrating a driving support process.
Figure 4A:
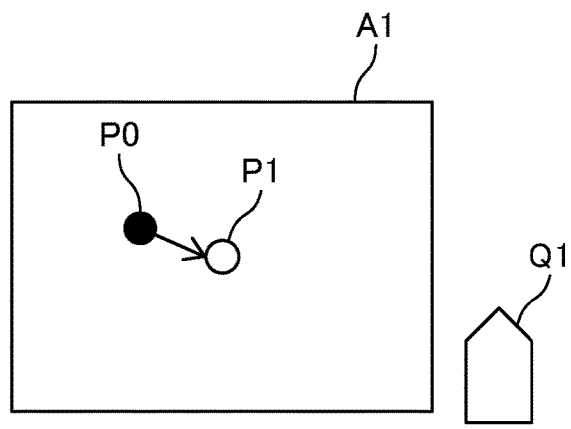
FIG. 4A is a view illustrating a conventional object detection process.
Figure 4B:
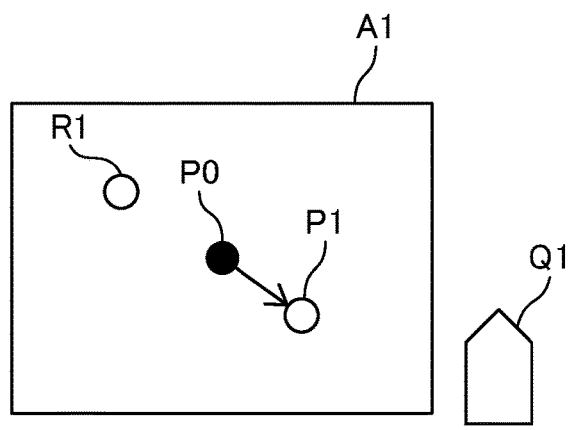
FIG. 4B is a view illustrating a conventional object detection process.

The object detection unit 101 detects objects existing around the own vehicle 50. The object detection unit 101 obtains object information detected from the radar sensor 22, and identifies the object position based on the obtained object information. Thereby, the object detection unit 101 detects each object. As illustrated in FIGS. 2A to 2C, the object detection unit 101 identifies the object position based on the object information, on an XY plane (that is, a horizontal plane) with an X axis that is a vehicle width direction and a Y axis that is a vehicle length direction, wherein a center position of the own vehicle 50 is determined as an origin of each of the X axis and the Y axis. In this manner, the object detection unit 101 identifies the object position as the relative position with respect to the center position of the own vehicle 50.

The movement prediction unit 102 predicts a position of the movement destination of the detected object. The movement prediction unit 102 stores the object position (that is, a detection position) detected by the detection unit 101 into a memory means such as the RAM 16 in time series manner. The movement prediction unit 102 reads out the stored detection position for each object, and calculates a trajectory of each object on the XY plane based on a time series variation of the detected position. The movement prediction unit 102 identifies a predicted position Pf of the movement destination at which the object arrives after a predetermined time is elapsed from when the object starts to move from a current position Pc (the position of the movement origin), based on the calculated trajectory of each object. Thereby, the movement prediction unit 102 predicts the position of the movement destination of the object.

The tracking region setting unit 103 sets the tracking region to be set for tracking the moving object. The tracking region setting unit 103 sets the tracking region A, depending on the predicted position Pf of the movement destination of the object predicted by the movement prediction unit 102. As illustrated in FIGS. 2A to 2C, the tracking region setting unit 103 sets a region having a predetermined width as the tracking region A, in each of the X axis and the Y axis, based on an XY coordinate at the predicted position Pf in the movement destination of the object.

The tracking region limiting unit 104 limits the tracking region A which is set. The tracking region limiting unit 104 excludes, from the tracking region A set by the tracking region setting unit 103, a region B (hereinafter, referred to as a "tracking exclusion region") where objects that are not suitable as tracking targets may be detected with high probability. The tracking exclusion region B is the region that is located on the rear side of the position of the movement destination of the object, as seen from the own vehicle 50. For example, the region is located behind the position of the movement destination of the object, relative to a moving direction of the object. That is, the region is located in the direction of the object and further from the own vehicle 50 than the object is. The tracking region limiting unit 104 sets the region satisfying one of the following requirements (1) to (3) as the tracking exclusion region B, and excludes the tracking exclusion region B from the tracking region A.

(1) FIG. 2A shows a region that is located beyond a line segment L, as seen from the own vehicle 50, of two regions divided by the line segment L passing through the current position Pc of the object along the front and back direction (that is, the Y axis direction corresponding to a longitudinal direction) in a traveling direction of the own vehicle 50, in the tracking region A.

(2) FIG. 2B shows a region that is located beyond a line segment L, as seen from the own vehicle 50, of two regions divided by the line segment L passing through the current position Pc of the object along the right and left direction (that is, an X axis direction corresponding to a lateral direction) which is a direction orthogonal to the traveling direction of the own vehicle 50, in the tracking region A.

(3) FIG. 2C shows a region that is located beyond a line segment L, as seen from the own vehicle 50, of two regions divided by the line segment L passing through the current position Pc of the object along the direction orthogonal to a moving direction M of the predicted object on the XY plane (that is, the horizontal plane), in the tracking region A.

That is, in this embodiment, the tracking region limiting unit 104 sets, as the tracking exclusion region B, the region located on a further side, with respect to the own vehicle 50, of two regions divided by the drawn line segment L passing through the current position Pc of the object in accordance with any of the above conditions, in the tracking region A. In other words, the set tracking exclusion region B is a region that is located in the direction of the object and further from the own vehicle 50 than the object is.

Thereby, the movement prediction unit 102 limits the tracking region A for tracking the moving object. Note that as illustrated in FIG. 2A to 2C, the tracking region A, after exclusion, includes the predicted position Pf of the movement destination of the object, and the predicted position Pf is not excluded from the tracking region A.

The tracking exclusion region B is set for the tracking region limiting unit 104. At that time, the tracking exclusion region B may be determined based on experimentation results previously determined, and may be determined accordingly based on the travelling information of the own vehicle 50, the object information of the tracking target, and so on. In addition, the setting for the tracking exclusion region B may be set as all or a part of the region satisfying one of the above requirements (1) to (3). Moreover, the setting for the tracking exclusion region B may be set as all or a part of the region satisfying any of the above requirements (1) to (3). Furthermore, the setting for the tracking exclusion region B may be set as all or a part of the region satisfying the plurality of the above requirements (1) to (3).

The collision determination unit 105 determines the risk of collision between the own vehicle 50 and the object, for each object. The collision determination unit 105 calculates a time to collision (TTC), (that is, a time until the own vehicle 50 collides with the object), based on the relative speed and the relative distance of the object with respect to the own vehicle 50. The collision determination unit 105 determines that there is a risk of the own vehicle 50 colliding with the object, if the time to collision (TTC) becomes shorter because the own vehicle 50 approaches the object and then the time to collision reaches a threshold value. The threshold value is set accordingly, based on the relative speed and the relative position of the object approaching the own vehicle 50, the type of the object, and a running environment of the own vehicle 50, etc. In addition, the threshold value is set accordingly, based on reliability of the detection results of the object (that is, reliability of the object information) by the camera sensor 20 or the radar sensor 22, and so on. Note that the running environment of the own vehicle 50 includes a state in which, for example, a road surface is slippery due to snow or freezing, or a state in which a road surface is not slippery.

The notification control unit 106 controls the actuation of the alarm apparatus (that is, one of the controlled targets 30), as the driving support for avoiding collision between the own vehicle 50 and the object or alleviating collision damage therebetween. The notification control unit 106 actuates the alarm apparatus and then sounds the alarm, if the collision determination unit 105 determines that there is a risk of the own vehicle 50 colliding with the object.

[2. Description of the Driving Support Processing]

Next, the driving support processing executed by the driving support system 1 according to this embodiment is described with reference to FIG. 2 and FIG. 3.

This processing is executed mainly by the driving support apparatus 10 included in the driving support system 1. The processing starts, for example, when the speed of the own vehicle 50 exceeds a predetermined speed from a state in which the own vehicle 50 stops (that is, the vehicle speed is 0). During a time until the own vehicle 50 has stopped again, this processing is repeatedly executed at a predetermined control period.

The driving support system 1 detects an object existing around the own vehicle 50 (S110). At that time, in the driving support apparatus 10, the object detection unit 101 performs the following processing. The object detection unit 101 obtains the object information detected by the radar sensor 22, and identifies the object position based on the obtained object information. Thereby, the driving support system 1 detects the object existing around the own vehicle 50. The above processing at the step S110 performed by the object detection unit 101 functions as an object detection means that detects the object existing around the own vehicle 50.

Next, the driving support system 1 predicts the position of the movement destination of the detected object (S120). At that time, in the driving support apparatus 10, the movement prediction unit 102 performs the following processing. The movement prediction unit 102 stores the object position (that is, the detection position) detected in the processing at the step S110, into the memory means such as the RAM 16 in a time series manner. The movement prediction unit 102 reads out the stored detection position of the object for each object, and calculates the trajectory of each object on the XY plane based on the time series variation of the detection position. The movement prediction unit 102 identifies the predicted position Pf of the movement destination at which the object arrives after the predetermined time is elapsed from when the object starts to move from the current position Pc (the position of the movement origin), based on the calculated trajectory of each object. Thereby, the driving support system 1 predicts the position of the movement destination of the object. The above processing at the step S120 performed by the movement prediction unit 102 functions as a movement prediction means that predicts the position of the movement destination of the object detected by the object detection means.

Next, the driving support system 1 sets the tracking region A for tracking the moving object (S130). At that time, in the driving support apparatus 10, the tracking region setting unit 103 performs the following processing. The tracking region setting unit 103 sets a region having the predetermined width as the tracking region A, in each of the X axis and the Y axis, based on the XY coordinate at the predicted position Pf of the movement destination of the object predicted in the processing at the step S120.

Next, the driving support system 1 limits the tracking region A based on the tracking exclusion region B where there is a high possibility of objects which are not suitable as tracking targets being detected (S140). At that time, in the driving support apparatus 10, the tracking region limiting unit 104 performs the following processing. The tracking region limiting unit 104 excludes the tracking exclusion region B from the tracking region A in the processing at the step S130. More specifically, the tracking region limiting unit 104 sets the region satisfying one of the above-mentioned requirements (1) to (3) as the tracking exclusion region B. and excludes the tracking exclusion region B from the tracking region A. Note that the description of a setting method for the tracking exclusion region B is omitted here. Thereby, the driving support system 1 limits the tracking region A for tracking the moving object. The above processing at the step S130 performed by the tracking region setting unit 103 and the above processing at the step S140 performed by the tracking region limiting unit 104 function as a plurality of tracking region setting means that set the tracking region A set for tracking the object as follows, depending on the position of the movement destination of the object predicted by the movement prediction means. In particular, these processing steps (S130, S140) set, as the tracking exclusion region B, the region that is located on the rear side of the position of the movement destination of the object, as seen from the own vehicle 50, and excludes the tracking exclusion region B from the tracking region A. For example, the tracking exclusion region B is located behind the position of the movement destination of the object, relative to a moving direction of the object. The processing steps (S130, S140) function as the means that sets the tracking region A so that the tracking region A which excludes the region B includes the position of the movement destination of the object. That is, the tracking range A, after exclusion, includes the position of the movement destination of the object.

Next, the driving support system 1 determines whether or not the object is detected within the limited tracking region A (S150). At that time, the driving support apparatus 10 determines whether or not the object is detected within the tracking region A after limiting the region in the processing at the step S140 (that is, after excluding the tracking exclusion region B), based on the object information obtained from the radar sensor 22. As the result, if the driving support system 1 determines that the object (that is, the tracking target) is detected within the tracking region A after limiting the region (S150: YES), the process proceeds to step S160. On the other hand, if the driving support system 1 determines that the object is not detected within the tracking region A after limiting the region (S150: NO), the process proceeds to step S170.

The driving support system 1 executes the tracking processing of the object detected in the processing of the step S150 (S160). The driving support apparatus 10 executes this tracking processing. At that time, the driving support apparatus 10 performs the following processing, for each object detected when executing the driving support processing in the current cycle (hereinafter, referred to as, "at a processing period in the current cycle"). The driving support apparatus 10 determines whether or not a positional history continues in this cycle and the detected object is identical with the object detected when executing the driving support processing at a previous time (hereinafter, referred to as a "at a processing period in the previous cycle"). In particular, the driving support apparatus 10 refers to the object position (that is, the detection position) stored in the memory means such as the RAM 16 in the time series manner. For the object detected at the processing period in the previous cycle, the driving support apparatus 10 calculates the trajectory of each object on the XY plane based on the time series variation of the detected position which has been referred by the driving support apparatus 10. The driving support apparatus 10 predicts a position at which each object arrives at the processing period in the current cycle (that is, an arrival position in the current cycle) and the moving direction and the moving speed of each object to the position, based on the calculated trajectory of each object. If the difference (between the arrival position, the moving direction, and the moving speed that are predicted, and the object position, the moving direction, and the moving speed that are detected at the processing period in the current cycle) is smaller than an upper limit value set in advance, the driving support apparatus 10 determines that the positional history continues and the detected object in the current cycle is identical with the detected object in the previous cycle. Note that the information about the object (detected as the identical object) detected at the previous cycle is sequentially taken over to the object detected at the current cycle. After that, in the driving support system 1, the process proceeds to step S180.

The driving support system 1 executes the extrapolation processing of the object detected in the processing at step S150 (S170). The driving support apparatus 10 executes this extrapolation. At that time, the driving support apparatus 10 performs the following processing, in response to a condition in which the object is not detected at the processing period in the current cycle. Assuming that the object is detected at the processing period in the current cycle, the driving support apparatus 10 continues the positional history for the object detected at the processing period in the previous cycle. In particular, the driving support apparatus 10 refers to the object position (that is, the detection position) stored in the memory means such as the RAM 16 in the time series manner. For the object to be detected at the processing period in the previous cycle, the driving support apparatus 10 calculates the trajectory of each object on the XY plane based on the time series variation of the detected position which has been referred by the driving support apparatus 10. The driving support apparatus 10 predicts the position at which each object arrives at the processing period in the current cycle (that is, the arrival position in the current cycle) and the moving direction and the moving speed of each object to the position, based on the calculated trajectory of each object. Assuming that the object is detected as the predictions of the arrival position, the moving direction, and the moving speed of the object, the driving support apparatus 10 extrapolates the assumed object as the object detected at the in the current cycle. Note that the information (that is, base data of the assumption) about the object detected at the processing period in the previous cycle is subsequently taken over to the object extrapolated in the current cycle. The above processings at steps S150, S160 and S170 performed by the driving support apparatus 10 function as an object tracking means that tracks the object, using the tracking region A set by the tracking region setting means. After that, in the driving support system 1, the process proceeds to step S180.

The driving support system 1 determines whether or not there is a risk of the own vehicle 50 colliding with the object (S180). At that time, in the driving support apparatus 10, the collision determination unit 105 performs the following processing for each object. The collision determination unit 105 calculates the time to collision (TTC) between the own vehicle 50 and the object, based on the relative speed and the relative distance of the object with respect to the own vehicle 50. The collision determination unit 105 determines that there is a risk of the own vehicle 50 colliding with the object, if the time to collision (TTC) becomes shorter because the own vehicle 50 approaches the object and then the time to collision reaches a threshold value. As the result, if the driving support system 1 determines that there is a risk of collision in which the own vehicle 50 collides with the object (S180: YES), the process proceeds to step S190. On the other hand, if the driving support system 1 determines that there is no risk of the own vehicle 50 colliding with the object (S180: NO), this processing ends. The above processing at the step S180 performed by the collision determination unit 105 functions as a collision determination means that detects the risk of collision between the object tracked by the object tracking means and the own vehicle 50.

The driving support system 1 sounds the alarm to the driver, for avoiding collision between the own vehicle 50 and the object or alleviating collision damage therebetween (S190). At that time, in the driving support apparatus 10, the notification control unit 106 performs the following processing. The notification control unit 106 controls the actuation of the alarm apparatus (that is, one of the controlled targets 30) and sounds the alarm, in response to the determination in the processing at the step S180 that there is a risk of collision in which the own vehicle 50 collides with the object. The above processing at the step S190 performed by the notification control unit 106 functions as a driving support means that executes the driving support for avoiding collision between the own vehicle 50 and the object or alleviating collision damage therebetween, if the collision determination means determines that there is a risk of collision in which the own vehicle 50 collides with the object. After that, in the driving support system 1, this processing ends.

[3. Effects on the Embodiment]

As described, the driving support system 1 according to the embodiment has the following effects and advantages. The driving support system 1 according to this embodiment sets, as the exclusion region B, the region located on the rear side of the position of the movement destination of the object (that is, the region behind the position of the movement destination of the object), as seen from the own vehicle 50, when setting the tracking region A for tracking objects existing around the own vehicle 50, and the driving support system 1 excludes the exclusion region B from the tracking region A. In other words, The driving support system 1 according to this embodiment sets, as the exclusion region B, the region located in the direction of the object and further from the own vehicle 50 than the object is, when setting the tracking region A for tracking objects existing around the own vehicle 50. Note that the tracking region A, after exclusion, includes the position of the predicted movement destination of the object. Accordingly the present driving support system 1 may be prevented from detecting the object that is not suitable as the tracking target. That is to say, there is a low risk of the present driving support system 1 detecting objects which are not suitable as the tracking target, since the driving support system 1 excludes, from the tracking region A, the region where there is a high possibility of objects which are not suitable as tracking targets being detected. Therefore, the present driving support system 1 can precisely track the object during object detection performed in the driving support for avoiding collision between the object existing around the own vehicle 50 and the own vehicle 50 or alleviating collision damage therebetween.

[4. The Other Embodiment]

In the above descriptions, one embodiment in the driving support system of the present disclosure is described. However, the present disclosure is not limited to the above embodiment. The driving support system of the present disclosure can perform processing in the following various aspects, for example.

(1) In the above embodiment, the present system controls the alarm apparatus (that is, one of the controlled targets 30) and sounds the alarm, if determining in the driving support processing that there is a risk that the own vehicle 50 collides with the object. However, the present invention is not limited to this configuration. As a modification, the present system may control the other controlled targets 30 and may execute the driving support for avoiding collision between the object existing around the own vehicle 50 and the own vehicle 50 or alleviating collision damage therebetween. As one example, in the modification, the present system may control the actuator (that is, one of the controlled targets 30) and may execute the driving support for driving the braking, the steering, the seat belt, and so on.

(2) Functions provided by the driving support system of the present disclosure can be provided in the following manner. In particular, the forms are the driving support apparatus 10 included in the driving support system 1, the program for enabling a computer as the driving support apparatus 10, and a record medium storing this program, etc. In addition, a driving support method executed by the program and so on are also considered as embodiments.

REFERENCE SIGNS LIST

1 . . . Driving support system
10 . . . Driving support apparatus
12 . . . CPU
14 . . . ROM
16 . . . RAM
20 . . . Camera sensor
22 . . . Radar sensor
24 . . . Yaw rate yaw rate
26 . . . Vehicle speed sensor
30 . . . Controlled targets
101 . . . Object detection unit
102 . . . Movement prediction unit
103 . . . Tracking region setting unit
104 . . . Tracking region limiting unit
105 . . . Collision determination unit
106 . . . Notification control unit

The invention claimed is:

1. A driving support system comprising:
an object detection means for detecting an object existing around an own vehicle;
a movement prediction means for predicting a position of a movement destination of the object detected by the object detection means;
a tracking region setting means for setting a tracking region for tracking the object, depending on the position of the movement destination of the object predicted by the movement prediction means, the tracking region being set excluding a region located further from the own vehicle in a direction of the object than the object is as a tracking exclusion region such that the position of the movement destination of the object is included within the tracking region after exclusion;
an object tracking means for tracking the object by using the tracking region set by the tracking region setting means;
a collision determination means for determining a risk of collision between the object tracked by the object tracking means and the own vehicle; and
a driving support means for executing a driving support for avoiding collision between the own vehicle and the object or alleviating collision damage therebetween, when the collision determination means determines that there is the risk of collision between the own vehicle and the object.

2. The driving support system according to claim 1, wherein
the tracking exclusion region includes a region located beyond a line segment, as seen from the own vehicle, of two regions that are divided by the line segment passing through a current position of the object along a longitudinal direction of the own vehicle, in the tracking region.

3. The driving support system according to claim 1, wherein
the tracking exclusion region includes a region located beyond a line segment, as seen from the own vehicle, of two regions that are divided by the line segment passing through the current position of the object along a lateral direction of the own vehicle, in the tracking region.

4. The driving support system according to claim 1, wherein
the tracking exclusion region includes a region located beyond a line segment, as seen from the own vehicle, of two regions that are divided by the line segment passing through the current position of the object along an orthogonal direction on a horizontal plane with respect to a predicted moving direction of the object, in the tracking region.

* * * * *